United States Patent
Losfeld et al.

(10) Patent No.: US 7,445,853 B2
(45) Date of Patent: Nov. 4, 2008

(54) LAYERED FILTER STRUCTURE COMPRISING SHORT METAL FIBERS

(75) Inventors: Ronny Losfeld, Waregem (BE); Johan Versieck, Drongen (BE)

(73) Assignee: NV Bekaert SA, Zwevegem (BE)

( * ) Notice: Subject to any disclaimer, the term of this patent is extended or adjusted under 35 U.S.C. 154(b) by 295 days.

(21) Appl. No.: 10/531,414

(22) PCT Filed: Oct. 6, 2003

(86) PCT No.: PCT/EP03/50691
§ 371 (c)(1), (2), (4) Date: Apr. 15, 2005

(87) PCT Pub. No.: WO2004/035174
PCT Pub. Date: Apr. 29, 2004

(65) Prior Publication Data
US 2006/0003162 A1     Jan. 5, 2006

(30) Foreign Application Priority Data
Oct. 17, 2002 (EP) ................................. 02079793

(51) Int. Cl.
- B32B 5/12 (2006.01)
- B32B 5/02 (2006.01)
- B32B 5/26 (2006.01)
- B32B 3/24 (2006.01)
- B32B 15/01 (2006.01)

(52) U.S. Cl. .................. 428/615; 428/212; 428/311.11; 428/605; 428/609; 428/613; 75/751

(58) Field of Classification Search .................. None
See application file for complete search history.

(56) References Cited

U.S. PATENT DOCUMENTS

| | | | |
|---|---|---|---|
| 4,703,898 A * | 11/1987 | Nakagawa et al. | 241/30 |
| 4,729,871 A | 3/1988 | Morimoto | |
| 4,793,928 A * | 12/1988 | Tsukamoto et al. | 210/344 |
| 5,133,864 A * | 7/1992 | Vaughn et al. | 210/437 |
| 6,333,468 B1 * | 12/2001 | Endoh et al. | 174/256 |
| 6,355,082 B1 * | 3/2002 | Ishibe | 55/528 |
| 2004/0050023 A1 * | 3/2004 | Wastjin et al. | 55/482 |

(Continued)

FOREIGN PATENT DOCUMENTS

EP     1 018 357 A1     7/2000

(Continued)

OTHER PUBLICATIONS

KR 2001018726 English Abstract from DWPI, Jun et al, Method for manufacturing metal fiber sinter, May 2002.*

(Continued)

*Primary Examiner*—Keith D. Hendricks
*Assistant Examiner*—Jason L Savage
(74) *Attorney, Agent, or Firm*—Foley & Lardner LLP

(57) ABSTRACT

The invention relates to a layered filter structure, said filter element comprises—a first layer, said first layer comprising a porous metal layer;—a second layer, said second layer comprising a self-supporting layer of sintered short metal fibers. The first and the second layer are sintered together. The layered filter structure is in particular suitable as surface filtration medium, for example for the filtration of liquids or gases.

19 Claims, 1 Drawing Sheet

U.S. PATENT DOCUMENTS

2004/0129649 A1 * 7/2004 Vanhoutte .................. 210/767

FOREIGN PATENT DOCUMENTS

| EP | WO 02/083267 | * | 10/2002 |
|----|---|---|---|
| GB | 889583 | * | 2/1962 |
| GB | 1190844 | | 5/1970 |
| JP | 02-175803 | * | 7/1990 |
| JP | 05-031781 | * | 2/1993 |
| WO | WO 02/47854 A1 | | 6/2002 |
| WO | WO 02/057035 A1 | | 7/2002 |

OTHER PUBLICATIONS

KR 2003067251 English Abstract from DWPI, Shin et al, Metal fiber filter production, Jun. 2006.*

JP 05-031781 Derwent English Abstract, Kanetake et al, Feb. 1993.*

* cited by examiner

LAYERED FILTER STRUCTURE COMPRISING SHORT METAL FIBERS

FIELD OF THE INVENTION

The invention relates to a layered filter structure and to a method of manufacturing such a layered filter structure. The invention further relates to the use of a layered filter structure as a surface filter.

BACKGROUND OF THE INVENTION

In surface filtration, particles are captured at the surface of a filter membrane. The size of the captured particles is determined by the pores at or near the surface of the filter membrane.

There is little or no migration of dust into the matrix of the filter medium.

Surface filters comprising a top layer of powder particles such as metal powder particles are known in the art A top layer comprising metal particles is characterized by a low open area and consequently such a top layer may easily capture particles.

However, surface filters having a top layer of powder particles show a limited porosity and therefore a high pressure drop.

SUMMARY OF THE INVENTION

It is an object of the present invention to provide a layered filter element avoiding the drawbacks of the prior art.

It is another object to provide a layered filter element whereby the porosity of the first layer and the porosity of the second layer can be chosen within a wide range; independently of each other.

It is still another object to provide a chemically inert filter element, which can easily and repeatedly be cleaned, for example by back flushing or back washing, and which therefore has a high durability and a long life time.

According to a first aspect of the present invention a layered filter element is provided.

The layered filter element comprises:
- a first layer, said first layer comprising a porous metal layer;
- a second layer, said second layer comprising a self-supporting layer of sintered short metal fibers.

The first layer and the second layer are sintered together.

The first layer is supporting the second layer, whereas the second layer is functioning as a separating or filtering layer.

For the purpose of this invention 'self-supporting layer' is defined as a layer that is supporting itself. This means that the second layer can be handled as such, it can for example be transported as such.

Preferably, the first layer is sintered.

The first layer may comprise metal powder particles, short metal fibers, long metal fibers or combinations thereof.

For the purpose of this invention short fibers are defined as fibers having a length over diameter ratio (L/d) ranging between 30 and 100.

The equivalent diameter of the short fibers is preferably between 1 and 20 µm.

With equivalent diameter is meant the diameter of an imaginary circle having the same surface of the surface of a cross section of a metal fiber.

Long fibers are defined as fibers having a length over diameter (L/d) higher than 100.

In a preferred embodiment the first layer comprises at least one non-woven metal fiber fleece comprising long metal fibers.

The long metal fibers preferably have an equivalent diameter ranging between 0.5 µm and 100 µm. More preferably, the equivalent fiber diameter is between 0.5 µm and 50 µm, e.g. between 1 µm and 25 µm, such as 2 µm, 4 µm, 8 µm or 12 µm.

The metal fibers may be obtained by any technique known in the art, they may for example be obtained by bundle drawing or by foil shaving techniques.

Preferably, the non-woven metal fiber fleece is sintered. Possibly, the non-woven metal fiber fleece is compacted for example by means of a cold isostatic pressing operation.

The porosity of the first layer is preferably higher than 50%, more preferably the porosity of the first layer is higher than 60%, for example between 70 and 85%.

The first layer may comprise only one metal fiber fleece or may comprise a stack of different metal fiber fleeces, each fleece comprising fibers with a specific equivalent diameter, fiber density and weight of the layer. The weight of a layer is expressed in g/m$^2$ and will hereafter be referred to as 'specific layerweight'.

In case the first layer comprises different metal fiber fleeces, the first layer is preferably sintered.

Alternatively, each metal fiber fleece being part of the first layer is sintered separately in advance.

In another embodiment the first layer comprises a porous metal layer of sintered powder particles.

As metal powder particles any known metal powder particles such as pulverized powder particles or atomised powder particles can be used. Either metal powder particles with a regular, spherical shape or metal powder particles with an irregular shape are suitable.

In a further embodiment the porous layer comprises short metal fibers. The first layer may be supported by a reinforcing structure such as a wire mesh.

The second layer comprises a self-supporting layer of short metal fibers which are sintered together.

Preferably, the second layer comprises a substantially flat layer.

With 'substantially flat' is meant that the $R_t$ value measured over a length equal to the thickness of the second layer is less than three times the equivalent diameter of a short metal fiber of the second layer. More preferably, the $R_t$ value is less than the equivalent diameter of a short metal fiber of the second layer, for example less than 50% of the equivalent diameter of a short metal fiber of the second layer.

$R_t$ is defined as the maximum roughness depth, i.e. the distance between the highest and the lowest points of the surface profile within the evaluation length, here a length equal to the thickness of the second layer.

Preferably, the second layer comprises short metal fibers that are three-dimensionally orientated.

The short metal fibers have preferably an equivalent diameter ranging between 1 µm and 20 µm. More preferably, the equivalent fiber diameter is between 1 µm and 10 µm, as for example 2 µm.

The short metal fibers may comprise fibers having a columnar shape or they may comprise curved and/or entangled fibers such as the fibers described in WO02/057035.

The short metal fibers of the second layer have numerous contact points, consequently they can easily be sintered without requiring high forces.

The pores between the short metal fibers are very small, but the number of pores are high so that the second layer is characterized by a high porosity.

The porosity of the second layer is preferably higher than 50%, more preferably the porosity of the second layer is higher than 60%, for example between 80 and 85%.

The second layer may comprises in addition to the short metal fibers, other metal particles such as long metal fibers or metal powder particles or a combination of short metal fibers and metal powder particles. The second layer comprises for example between 20 and 80% short metal fibers and between 20 and 80% long metal fibers. In an alternative embodiment, the second layer comprises between 20 and 80% short metal fibers and between 20 and 80% metal powder particles. With x percent short metal fibers/long metal fibers is meant that x weight percent of the total weight of the second layer consists of short metal fibers/long metals fibers. The porosity of the second layer may range between 50% and 85%.

The short metal fibers may be obtained by any technique known in the art. The metal fibers may for example be obtained by mechanically cutting long metal fibers into short or by cutting long metal fibers into short by a chemical method.

Any type of metal or metal alloy may be used to provide the metal particles such as the long metal fibers, the short metal fibers or the metal powder particles. The metal particles are for example made of steel such as stainless steel. Preferred stainless steel alloys are AISI 300 or AISI 400-series alloys, such as AISI 316L or AISI 347, or alloys comprising Fe, Al and Cr, stainless steel comprising chromium, aluminum and/or nickel and 0.05 to 0.3% by weight of yttrium, cerium, lanthanum, hafnium or titanium, known as Fecralloy®, are used. The metal particles can also be made of nickel or a nickel alloy.

The first layer and the second layer may be made from a different material. However, it is preferred that the first layer and the second layer are made of the same material.

The filter elements according to the present invention may have any shape. The element may be flat filter elements or cylindrical filter elements, such as candle filters or tubular filters.

Candle filters are cylindrical tubes, closed at one end. Tubular filters are cylindrical tubes open at both ends.

Cylindrical filter elements may have a longitudinal welding seam or may be seamless.

A great advantage of the layered filter element according to the present invention is that the porosity of the first layer and the porosity of the second layer can be chosen within a wide range.

Furthermore, the porosity of the first layer and the porosity of the second layer can be chosen independently of each other.

The layered filter element according to the present invention can easily be cleaned, for example by back flushing or back pulsing.

According to a second aspect of the present invention a method of manufacturing a layered filter element is provided.

The method comprises the steps of
providing a first layer, said first layer comprising a porous metal layer;
providing a second layer, said second layer comprising a self-supporting layer of sintered short metal fibers;
bringing said first layer and said second layer in contact with each other to form a layered structure;
sintering the layered structure.

According to a third aspect of the present invention the use of a layered filter element as a surface filter is provided. The layered filter element according to the present invention is suitable for the filtration of gases or liquids.

The layered filter element is very suitable for the filtration of air as for example in clean rooms as for example production rooms for electronic components.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
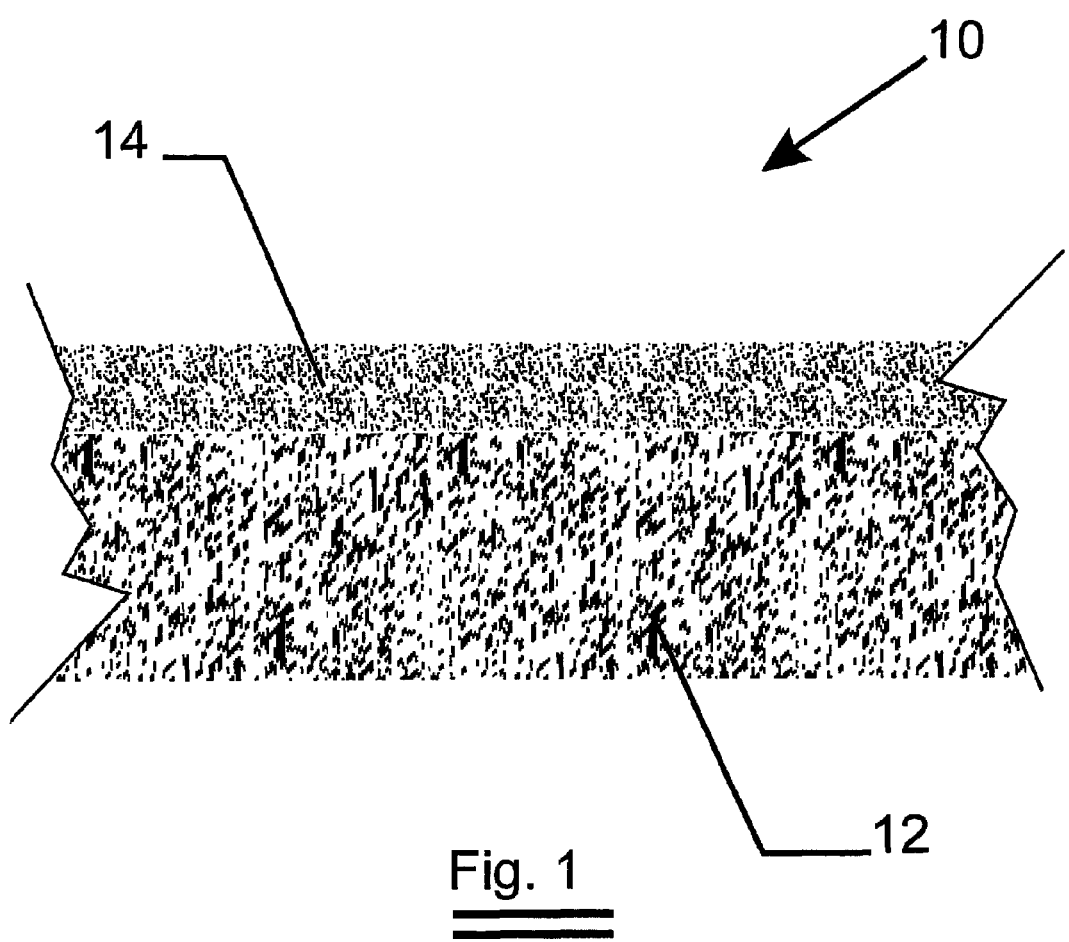
FIG. 1 is an illustration of a layered filter element according to the present invention.

Referring to FIG. 1, a layered filter element 10 according to the invention comprises a first layer 12 and a second layer 14.

The first layer 12 comprises a sintered non-woven metal fiber fleece of long metal fibers. The metal fibers of the first layer have a diameter of 22 μm. The weight of the first layer is 225 g/m$^2$.

The first layer is manufactured as follows:

Steel fibers are made by means of the technique of bundled drawing. A non-woven metal fiber fleece is then produced by means of a random feeder apparatus which is disclosed e.g. in GB 1 190 844. In a subsequent step, the non-woven metal fiber fleece is sintered.

The second layer 14 comprises a self-supporting layer of three-dimensionally orientated short metal fibers which are sintered together. The short metal fibers of the second layer have a diameter of 2 μm. The weight of the second layer is 60 g/m$^2$. The second layer is compacted until a thickness of 0.03 mm. The second layer has a porosity of 75%.

The second layer is for example formed by pouring short metal fibers in a three-dimensional mould or on a flat surface and by subsequently sintering the short metal fibers.

The short metal fibers are obtained by firstly individualizing to some extent metal fibers, being present in a bundle of fibers, in a yarn or a textile structure or even as staple fibers by a carding operation. These more or less individualized fibers are brought into a comminuting device. In this device, each fiber is cut into short metal fibers by fast rotating knives. The blade of these knives, having a certain blade thickness, encounter or "hit" the fibers usually in a radial direction. The fibers are mechanically plastically deformed and entangled or possible broken into fibers with a smaller length. Due to the centrifugal force, the so provided short metal fibers are blown outwardly against the external wall of the comminuting device. This external wall comprises a sieve with well-defined openings. According to these openings, short metal fibers with a certain length may pass through the sieve, whereas too long short metal fibers will stay in the comminuting device, they will be hit again and if they are sufficiently small they will pass the sieve.

The second layer is put on the first layer. The thus obtained structure is sintered in a subsequent step to obtain a layered filter element.

The invention claimed is:

1. A layered filter structure, comprising:
a first layer, said first layer comprising a porous metal layer comprising a non-woven metal fiber fleece comprising long metal fibers; and
a second layer, said second layer consisting of a self-supporting layer of sintered short metal fibers;
said first layer and said second layer being sintered together.

2. A layered filter structure according to claim 1, wherein said second layer has a maximum roughness depth defined by an $R_t$ value of less than three times an equivalent diameter of a short metal fiber of said second layer, said $R_t$ value being measured over a length equal to a thickness of said second layer.

3. A layered filter structure according to claim 1, wherein said short metal fibers of said second layer are three-dimensionally randomly orientated.

4. A layered filter structure according to claim 1, wherein the metal fibers of said first layer are sintered before the first and second layers are sintered together.

5. A layered filter structure according to claim 1, wherein said first layer further comprises metal powder particles.

6. A layered filter structure according to claim 1, wherein said first layer further comprises short metal fibers.

7. A layered filter structure according to claim 1, wherein said first layer is supported by a reinforcing structure.

8. A layered filter structure according to claim 1, wherein said first layer has a porosity ranging between 50 and 85%.

9. A layered filter structure according to claim 1, wherein said second layer has a porosity ranging between 50 and 85%.

10. A layered filter structure according to claim 1, wherein the layered filter structure is configured as a surface filtration medium.

11. A layered filter structure according to claim 10, wherein the layered filter structure is configured for the filtration of liquids or gases.

12. A layered filter structure according to claim 1, wherein the short metal fibers have a length over diameter ratio ranging between 30 and 100, and the long metal fibers have a length over diameter ratio higher than 100.

13. A layered filter structure according to claim 1, wherein the porous metal layer comprises a stack of different metal fiber fleeces.

14. A layered filter structure according to claim 1, wherein the first layer and the second layer are made of the same material.

15. A layered filter structure, comprising:
a first layer, said first layer comprising a porous metal layer comprising a non-woven metal fiber fleece comprising long metal fibers; and
a second layer, said second layer consisting of a self-supporting layer of sintered short metal fibers and one or more of long metal fibers and metal powder particles;
said first layer and said second layer being sintered together.

16. A layered filter structure according to claim 15, wherein said second layer consists of between 20 and 80% short metal fibers and between 20 and 80% long metal fibers and/or metal powder particles.

17. A method of manufacturing a layered filter structure, said method comprising the steps of:
providing a first layer, said first layer comprising a porous metal layer comprising a non-woven metal fiber fleece comprising long metal fibers;
providing a second layer, said second layer consisting of a self-supporting layer of short metal fibers which are sintered together;
bringing said first layer and said second layer in contact with each other to form a layered structure; and
sintering said layered structure.

18. A method of manufacturing a layered filter structure according to claim 17, wherein said first layer comprises a stack of different metal fiber fleeces.

19. A method of manufacturing a layered filter structure according to claim 18, wherein each fleece in the stack is sintered separately before the step of sintering the layered structure.

* * * * *